United States Patent
Eickhoff et al.

(10) Patent No.: US 11,223,054 B2
(45) Date of Patent: Jan. 11, 2022

(54) MODULATED THERMAL CONDUCTANCE THERMAL ENCLOSURE

(71) Applicant: Honeywell International Inc., Morris Plains, NJ (US)

(72) Inventors: Steven J. Eickhoff, Brooklyn Park, MN (US); Jeffrey Michael Klein, Minneapolis, MN (US)

(73) Assignee: Honeywell International Inc., Charlotte, NC (US)

( * ) Notice: Subject to any disclaimer, the term of this patent is extended or adjusted under 35 U.S.C. 154(b) by 150 days.

(21) Appl. No.: 16/781,133

(22) Filed: Feb. 4, 2020

(65) Prior Publication Data

US 2020/0176788 A1 Jun. 4, 2020

Related U.S. Application Data

(62) Division of application No. 15/631,187, filed on Jun. 23, 2017, now Pat. No. 10,593,967.

(60) Provisional application No. 62/356,627, filed on Jun. 30, 2016.

(51) Int. Cl.
*H01M 4/02* (2006.01)
*H01M 8/04007* (2016.01)
*H01M 8/2475* (2016.01)

(52) U.S. Cl.
CPC ..... *H01M 8/04067* (2013.01); *H01M 8/2475* (2013.01); *H01M 8/04007* (2013.01); *H01M 2250/30* (2013.01); *Y02B 90/10* (2013.01)

(58) Field of Classification Search
CPC ..................................................... H01M 4/02
See application file for complete search history.

(56) References Cited

U.S. PATENT DOCUMENTS

| | | | |
|---|---|---|---|
| 4,636,415 A | 1/1987 | Barito et al. |
| 5,032,439 A | 7/1991 | Glicksman et al. |
| 5,252,408 A | 10/1993 | Bridges et al. |
| 5,609,934 A | 3/1997 | Fay |
| 6,838,146 B2 | 1/2005 | Merrill |
| 6,859,364 B2 | 2/2005 | Yuasa et al. |
| 10,593,967 B2 | 3/2020 | Eickhoff et al. |
| 2006/0261304 A1 | 11/2006 | Muthukumaran et al. |

(Continued)

FOREIGN PATENT DOCUMENTS

| | | |
|---|---|---|
| AU | 2014316348 A1 | 1/2016 |
| CN | 1171379 A | 1/1998 |

(Continued)

OTHER PUBLICATIONS

"Chinese Application Serial No. 201710524268.9, Response filed Jul. 27, 2020 to Office Action dated May 11, 2020", (w/ English Translation of Amended Claims), 6 pgs.

(Continued)

*Primary Examiner* — Jacob B Marks
(74) *Attorney, Agent, or Firm* — Schwegman Lundberg & Woessner, P.A.

(57) ABSTRACT

A thermal insulation device includes a first plate, a second plate formed to nest adjacent the first plate with a gap between the first and second plates, a porous material disposed in the gap between the plates, a sealing layer disposed between the first and second plates such that the porous material is sealed from ambient at a pressure less than ambient, and a vapor generating material disposed in the gap.

5 Claims, 4 Drawing Sheets

(56) References Cited

U.S. PATENT DOCUMENTS

| | | | |
|---|---|---|---|
| 2009/0179541 A1 | 7/2009 | Smith et al. | |
| 2010/0071623 A1* | 3/2010 | Watanabe | C23C 14/12 118/726 |
| 2015/0241118 A1 | 8/2015 | Wu | |
| 2018/0003334 A1 | 1/2018 | Eickhoff et al. | |
| 2018/0006316 A1 | 1/2018 | Eickhoff et al. | |

FOREIGN PATENT DOCUMENTS

| | | |
|---|---|---|
| CN | 1275949 A | 12/2000 |
| CN | 102873966 A | 1/2013 |
| CN | 104937322 A | 9/2015 |
| CN | 107565067 A | 1/2018 |
| CN | 107565072 A | 1/2018 |
| EP | 2947369 A1 | 11/2015 |
| JP | 04-309778 A | 11/1992 |
| JP | 11130187 A | 5/1999 |
| JP | 2002081595 A | 3/2002 |
| JP | 2002-310383 A | 10/2002 |
| JP | 2011111753 A | 6/2011 |
| WO | WO-2014184393 A1 | 11/2014 |

OTHER PUBLICATIONS

"Chinese Application Serial No. 201710524268.9, Office Action dated May 11, 2020", (w/ English Translation), 7 pgs.

"U.S. Appl. No. 15/631,187, Notice of Allowability dated Feb. 3, 2020", 5 pgs.

"U.S. Appl. No. 15/631,187, Notice of Allowance dated Nov. 4, 2019", 10 pgs.

"U.S. Appl. No. 15/631,187, Response filed Jul. 23, 2019 to Restriction Requirement dated May 23, 2019", 7 pgs.

"U.S. Appl. No. 15/631,187, Restriction Requirement dated May 23, 2019", 7 pgs.

"European Application Serial No. 17178078.6, Partial European Search Report dated Oct. 23, 2017", 17 pgs.

"European Application Serial No. 17178079.4, Extended European Search Report dated Nov. 16, 2017", 9 pgs.

"European Application Serial No. 17178079.4, Response filed Apr. 20, 2018 to Extended European Search Report dated Nov. 16, 2017", 31 pgs.

Abe, Hiroya, et al., "Dry Powder Processing of Fibrous Fumed Silica Compacts for Thermal Insulation", Am. Ceram. Soc., 88(5), (2005), 1359-1361.

Alama, M., et al., "Experimental characterisation and evaluation of the thermo-physical properties of expanded perlite-fumed silica composite for effective vacuum insulation panel (VIP) core", Energy and Buildings, 69, (2014), 1-24.

Berge, Axel, et al., "Literature Review of High Performance Thermal Insulation", Report 2012:2, Chalmers University of Technology, Gothenburg, Sweden, (2012), 40 pgs.

Davraz, Metin, et al., "Performance properties of vacuum insulation panels produced with various filling materials", Science and Engineering of Composite Materials, 21(4), (2014), 7 pgs.

Eickhoff, Steven J., "Modulated Thermal Conductance Thermal Enclosure", U.S. Appl. No. 15/631,187, filed Jun. 23, 2017, 33 pgs.

Lahousse, Sean W., et al., "Vacuum insulation using perlite powder sealed in plastic and glass", Thesis, Massachusetts Institute of Technology, (Feb. 1993), 70 pgs.

U.S. Appl. No. 15/623,778, filed Jun. 26, 2017, Thermal Enclosure.

U.S. Appl. No. 15/631,187 U.S. Pat. No. 10,593,967, filed Jun. 23, 2017, Modulated Thermal Conductance Thermal Enclosure.

"Chinese Application Serial No. 201710524268.9, Office Action dated Oct. 24, 2019", (w/ English Translation), 19 pgs.

"Chinese Application Serial No. 201710524268.9, Response filed Mar. 4, 2020 to Office Action dated Oct. 24, 2019", w/ English claims, 8 pgs.

"European Application Serial No. 17178078.6, Extended European Search Report dated Feb. 1, 2018", 14 pgs.

\* cited by examiner

MODULATED THERMAL CONDUCTANCE THERMAL ENCLOSURE

RELATED APPLICATION

This application is a divisional of U.S. application Ser. No. 15/631,187, filed Jun. 23, 2017, which claims priority to U.S. Provisional Application Ser. No. 62/356,627 (entitled Modulated Thermal Conductance Thermal Enclosure, filed Jun. 30, 2016) which are incorporated herein by reference in their entirety.

BACKGROUND

Conventional thermal insulating materials (e.g. polyisocyanurate, polystyrene, polyurethane) cannot meet the thermal resistance requirements of certain applications requiring thin, high performance thermal insulation (e.g. portable fuel cells). Vacuum-based thermal insulators (e.g. vacuum insulated panels) can meet the thermal performance requirements of these applications, but cannot be cost-effectively manufactured in custom form factors.

Some devices, such as power sources and sensors must operate over a broad range of ambient temperatures. Thermal insulators may be incapable of maintaining such devices within their operating range in the face of such a broad range of ambient temperatures.

SUMMARY

A thermal insulation device includes a first plate, a second plate formed to nest adjacent the first plate with a gap between the first and second plates, a porous material disposed in the gap between the plates, a sealing layer disposed between the first and second plates such that the porous material is sealed from ambient at a pressure less than ambient, and a vapor generating material disposed in the gap.

A thermal insulation enclosure includes a first plate, a second plate formed to nest adjacent the first plate with a gap between the first and second plates, a porous material disposed between the plates, a vapor generating material disposed in the gap, a sealing layer disposed between the first and second plates such that the porous material is sealed from ambient at a pressure less than ambient, a duplicate set of first and second plates having a porous material, vapor generating material and sealing layer formed to mate with the first and second plates to form a chamber, and a device disposed within the chamber that is thermally insulated from ambient by the enclosure.

A method includes pressing a porous material between two plates such that the plates are separated from each other by a gap defined by the porous material, including a vapor generating material in the gap, and in a partial vacuum, depositing a conformal sealing layer to cover the porous material in the gap between the two plates to form a gas seal of the porous material and vapor generating material from ambient and maintain the partial vacuum.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

A vacuum-based thermal insulator provides thermal resistance requirements of applications requiring thin insulation, and can be made in a wide range of custom form factors. In one embodiment, an improved high performance thermal enclosure includes a feedback mechanism which modulates its thermal resistance based on ambient temperature. At very low ambient temperatures the thermal resistance is high, while at high ambient temperatures the thermal resistance is low, enabling a device utilizing the enclosure to maintain a temperature which is within the device's operating range.

Figure 1:
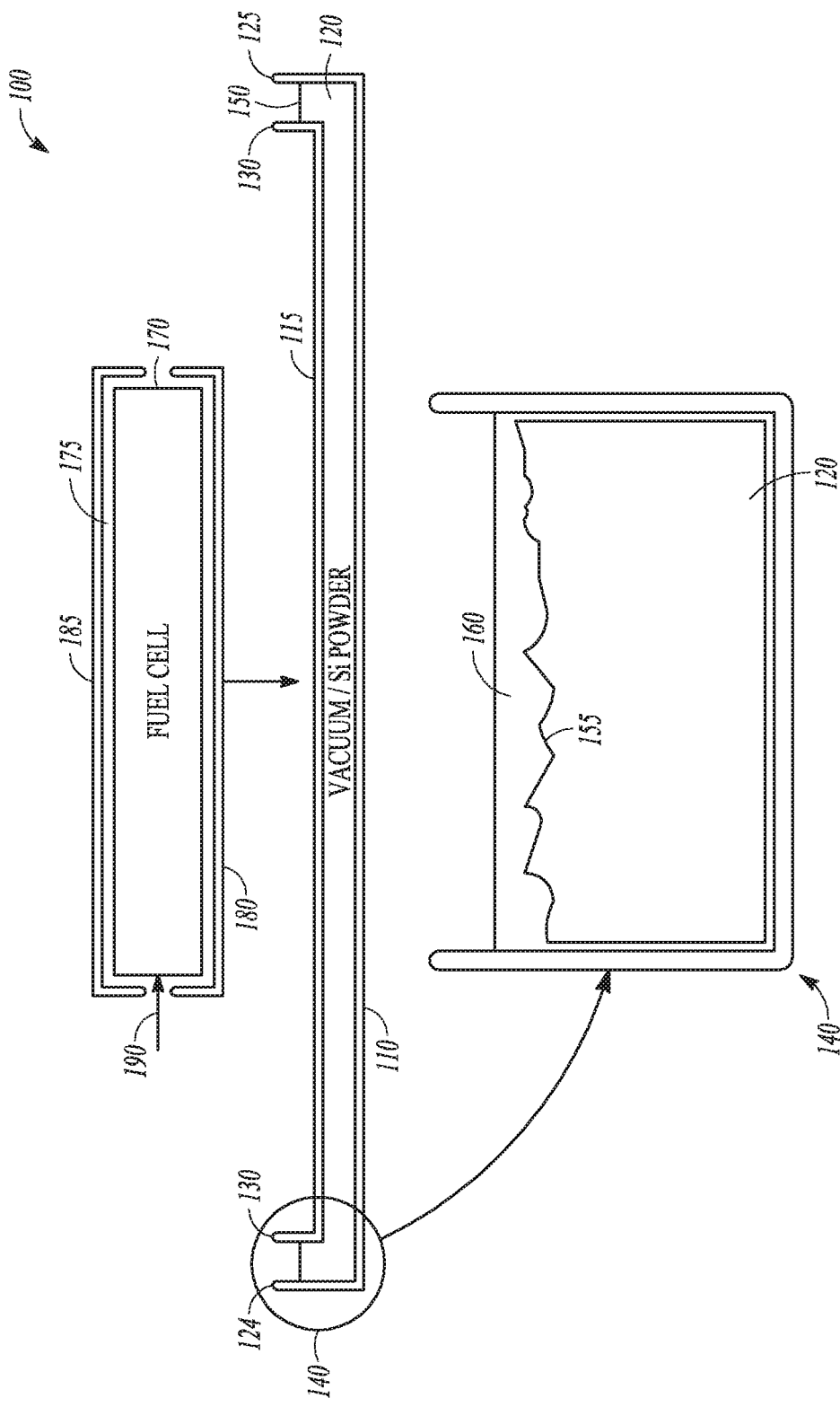
FIG. 1 is a block diagram cross sectional representation of a thermal insulator according to an example embodiment.

FIG. 1 is a block diagram cross section representation of a thermal insulator 100. The thermal insulator may be formed for an outside plate 110 spaced from an inside plate 115 by a nano-porous material 120. In one embodiment, the plates may be similarly shaped and of slightly different sizes such that the inside plate 115 may nest inside the outside plate 110, creating a space between them that the material 120 occupies. In one embodiment, the space may be fairly uniform between the plates.

In one embodiment, the plates have sides indicated at 125 and 130 that extend away from generally planar portions of the plates. The distance between the sides 125 and 130 may be the same as the distance between the generally planar portions of the plates, or may vary in further embodiments. The shape of the generally planar portion of the nested plates may be circular, oval, rectangular, or any other shape desired, such as a polygon. The sides of the plates extend along the entire perimeter of the generally planar portions. In still further embodiments, the generally planar portions of the plates may be curved as opposed to planar. Note that while the distance between the plates and sides of the plates is substantially equal in some embodiments, the distance may be varied in further embodiments where substantially uniform insulation is not needed.

A portion 140 of the sides of the plates is illustrated in further detail in a blown up view also at 140. The blown up view of portion 140 illustrates a sealing layer 150 that helps maintain a vacuum within the nano-porous material 120. In one embodiment, the sealing layer 150 includes a layer of a polymer 155, such as parylene or other low thermally conducting material and a metal layer 160 of low thermally conducting metal, such as aluminum or NiCr for example. A further polymer or other layer may be included in further embodiments.

In one embodiment, the polymer or plastic layer 155 may be between approximately 50 to 200 um thick. The metal layer may be approximately 80 nm thick. The purpose of the sealing layer 150 is to help maintain a vacuum, which may be simply a low pressure as opposed to an absolute vacuum, within the space between the plates. Thus, the thickness of each layer may be varied based on the material used to maintain the vacuum for a desired length of time. Since the metal layer may be more thermally conductive, it is desirable in some embodiments to utilize a metal and a thickness of the metal that minimizes its thermal conductance between the plates. The vacuum provides an area of low thermal conductance. K. As such, it may be varied between absolute and ambient pressure depending on the overall thermal properties desired. Ambient pressure may correspond to atmospheric pressure, which may vary with weather conditions and altitude or depth. In one embodiment, the vacuum is kept between 0 and 100 Pa (Pascal—Newtons/Meter$^2$). Note that the portion 140 shown is provided for illustration of the sealing layer 150 and may not be reflective of the actual shape of the portion 140.

In one embodiment, the material 120 may be a low-density (200-250 kg/m^3) mixture of fumed silica, fiberglass, and silicon carbide (and optionally getter materials to getter gas resulting from outgassing or leakage through the seal) may be pressed into a custom form factor enclosure, such as the two nesting plates 110 and 115. The fumed silica mixture fills the gap between the two nested plates that comprise an enclosure. The mixture is a nano-porous open cell material in one embodiment such that a significant portion of the value occupied by the material is open, as opposed to closed cell materials. A small gap thermally isolates the two plates; this gap is may be coated with a thin, low-thermal conductivity material (or materials) and forms a gas seal as indicated by sealing layer 150.

The space between the plates is evacuated, forming an enclosure with very high thermal resistance between the inner and outer plates. In one embodiment, a device 170, such as a fuel cell based power generator, can be placed within a pocket 175 created by two enclosures 180 and 185, and provide very high thermal resistance between the interior of the pocket and ambient environment. In the case of some fuel cells, the two enclosures may not be sealed together, to allow at least oxygen, indicated by arrow 190, from ambient to reach the device 170 for operation of the device. In further embodiments, where access to ambient is not needed, the enclosures may be sealed together by glue, welding, clamping, or other means of attaching the enclosures together.

Figure 2:
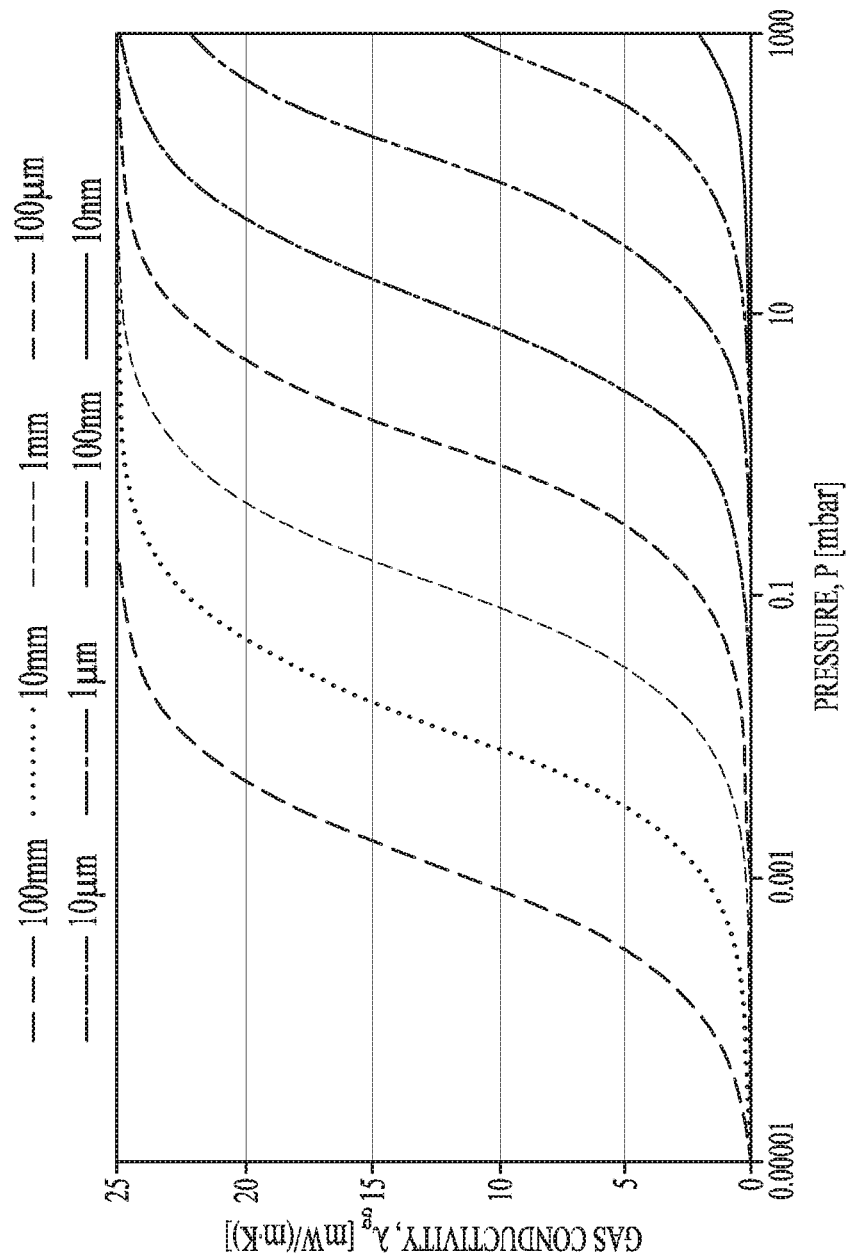
FIG. 2 is a chart illustrating calculated gas conductivity for air as a function of gas pressure for different characteristic system size according to an example embodiment.

FIG. 2 is a chart illustrating calculated gas conductivity for air as a function of gas pressure for different characteristic system size according to an example embodiment. The input temperature was 20° C., and the pore sizes are indicated by format of the line at the top of the figure, ranging from 10 nm to 100 mm. Note that the use of pores in the nanometer range allow operation at higher pressures for a same level of thermal conductivity, which may be easier to achieve and maintain over long periods of time.

In some embodiments, a vapor generating material is included in the material 120. The vapor generating material may have a pressure vs. temperature relationship that modulates the thermal conductance of the vapor in the gap between the enclosure plates, over a desired temperature range.

The vapor generating material may be selected such that vapor pressure is in a desired range (e.g. 100-1000000 Pa for Nano-porous silica) which modulates the thermal conductivity of the vapor over the desired ambient temperature range. Example materials include cyclohexane or water vapor. Different vapor generating materials may be selected depending on the pore size of the silica. Low density, small pore size materials other than silica may also be used if a different thermal resistance value or temperature range is desired. Other materials may include Isopropanol, 1-Butanol. Cyclohexane, Ethanol, and Ethyl acetate. In some embodiments, only one of the example materials or still other materials which generate vapor at a desired temperature is used.

For any particular embodiment, the vapor generating material may be selected on the basis of the desired temperature range of the application and the pore size of the powder. By matching an overall change in pressure for the desired temperature range with the pressure range that creates the largest change in gas conductivity at a given pore size (FIG. 2), the design can be optimized for a given application.

A method for forming a thermal enclosure is as follows:

1) Mixing a fumed silica, silicon carbide, fiber glass, and optionally getter material to create a nano-porous material. Note that such mixing is well known in the art as described in at least three papers, such as Dry Powder Processing of Fibrous Fumed Silica Compacts for Thermal Insulation Hiroya Abe,*,w Isami Abe, Kazuyoshi Sato,* and Makio Naito* 2005; Experimental characterisation and evaluation of the thermo-physical properties of expanded perlite—Fumed silica composite for effective vacuum insulation panel (VIP) core M. Alama, H. Singha,*, S. Brunncrb, C. Nazirisa 2015; Performance properties of vacuum insulation panels produced with various filling materials Metin Davraz* and Hilmi C. Bayrakci 2014.

In one embodiment, the mixture is composed of 70-90% fumed silica of approximately 10 um grain size, 1-10% SiC powder of approximately 0.5 um grain size, and 5-15% glass fibers, 1-2 mm×10 um. These are mixed mechanically at low speed (<1000 rpm) for several minutes.

2) Pressing the silica mixture between two plates that comprise the enclosure.

3) In a partial vacuum (<1000 Pa), deposit a conformal coating (e.g. 10-100 um of a polymer such as parylene) to cover the silica in the gap between the plates, forming a gas seal.

4) In a partial vacuum (<1000 Pa), deposit a layer of metal (e.g. 10-1000 nm of Al, NiCr) to cover the parylene.

5) Optionally repeat the polymer/metal coating process to create a multi-layer seal which further reduces permeability (increases lifetime)

The fumed silica mixture in one embodiment may be was 2/88/10% SiC/Fumed Silica/Glass fiber.

6) Optionally, add the vapor generating material to the gap. Alternatively, the vapor generating material could be added during the initial polymer coating process, by filling the deposition chamber with the desired material (provided it doesn't interfere with the deposition process). The vapor may also be introduced via other means, by for example breaking a capsule of the material within the gap, after the seal has been deposited. The capsule may be broken by any means that does not adversely degrade the seal, such as by sound waves or heat.

In some embodiments, the resulting adaptive insulation based on nano-porous silica provides approximately 10 times the thermal resistance of conventional insulation.

The use of a temperature dependent vapor pressure enables modulation of the thermal resistance. The thermal resistance may decrease at high temperatures within the enclosure, allowing heat to be transferred to ambient. At lower temperatures, the thermal resistance may increase.

Figure 3:
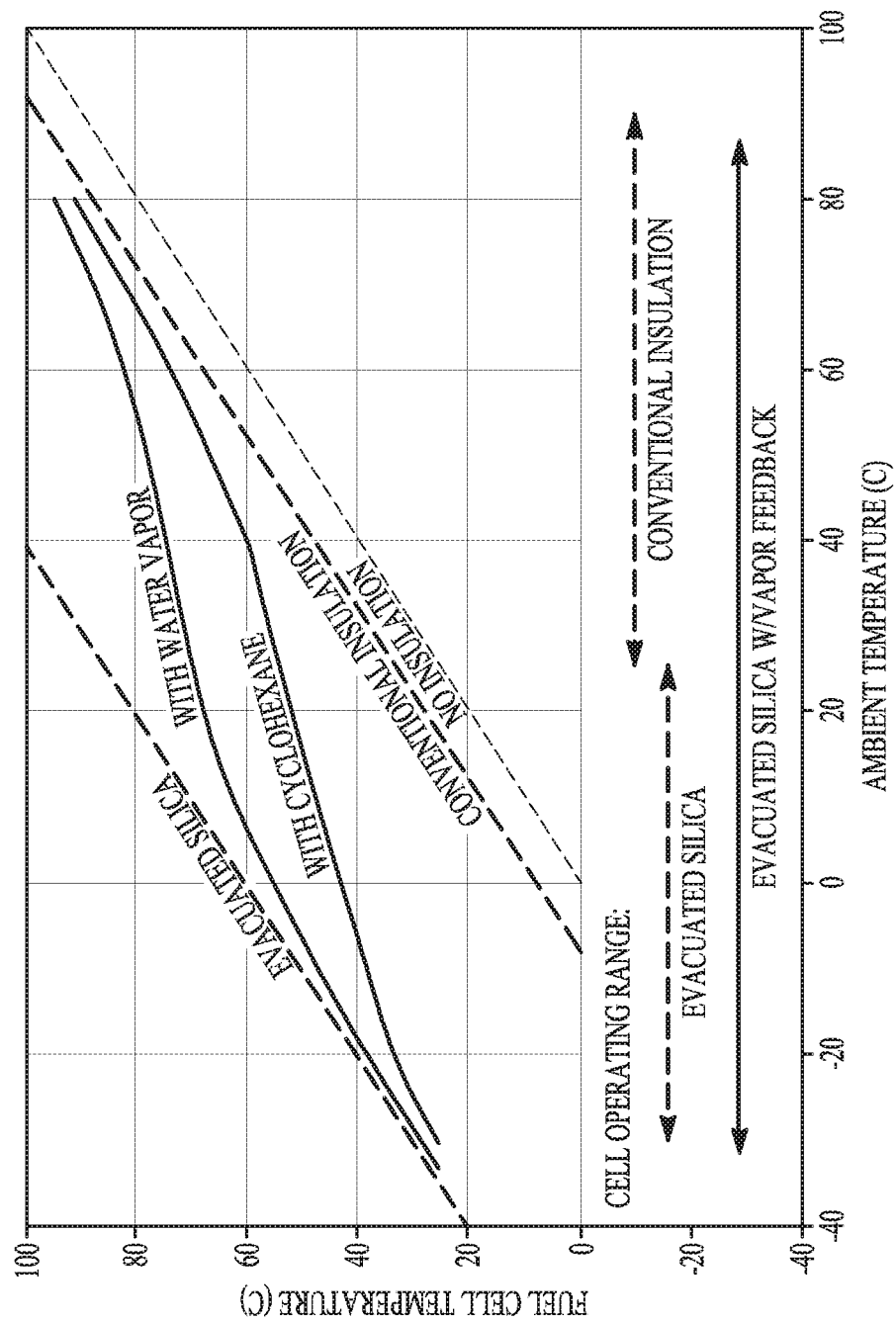
FIG. 3 is a slide providing further description of vapor generating material, and example test results.

FIG. 3 shows temperature of a fuel cell device versus ambient temperature. With a low thermal conductivity insulation design, the internal temperature of an enclosure can get too warm at high ambient temperatures, limiting an operating range of the fuel cell. Using the adaptive insulation with an appropriate vapor pressure temperature characteristics facilitates passive temperature feedback, expanding the operating range from −30° C. to 80° C. ambient.

Figure 4:
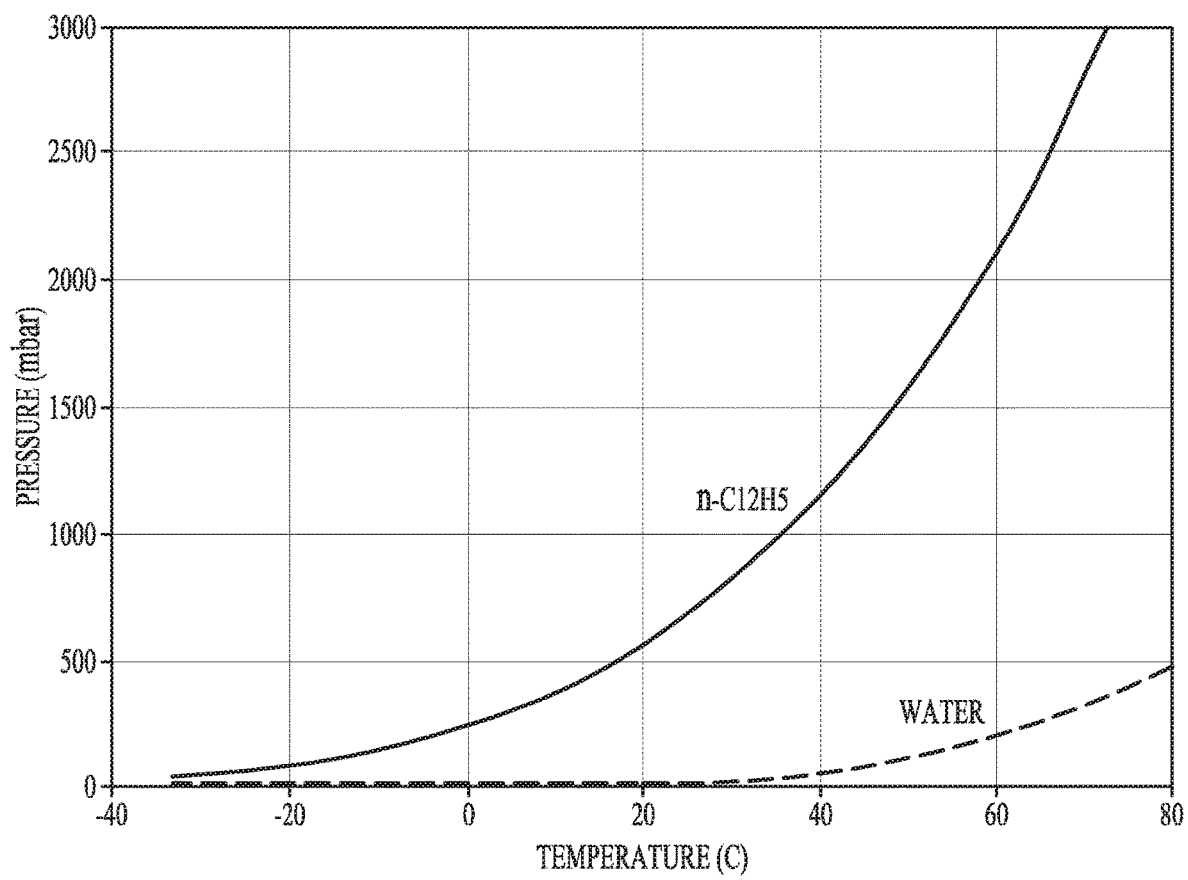
FIG. 4 is a graph illustrating pressure versus temperature for two materials.

FIG. 4 is a graph illustrating temperature versus pressure for two different vapors such as a vapor including water and a vapor including n-C12H5.

Figure 5:
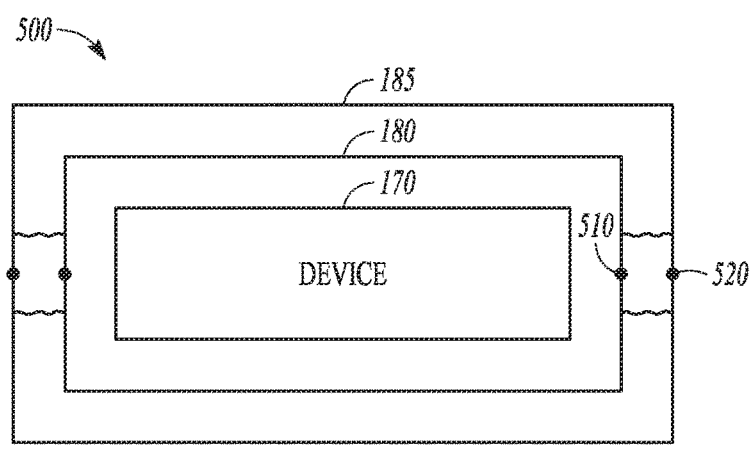
FIG. 5 is a block diagram representation of how two sets of plates are sealed to form an insulating enclosure around a device according to an example embodiment.

FIG. 5 is a block diagram representation of how two sets of plates 180, 185 are sealed at 510, 520 to form an insulating enclosure 500 around device 170. Seal 510 represents a sealing together of outer plates of the sets of plates, while seal 520 represents a sealing together of inner plates of the sets of plates. The seals 510 and 520 may be obtained via weld or adhesive in various embodiments.

Examples

1. A thermal insulation device including a first plate, a second plate formed to nest adjacent the first plate with a gap between the first and second plates, a porous material disposed in the gap between the plates, a sealing layer disposed between the first and second plates such that the porous material is sealed from ambient at a pressure less than ambient, and a vapor generating material disposed in the gap.

2. The thermal insulation device of example 1 wherein the vapor generating material has a pressure vs. temperature relationship that modulates the thermal conductance of the vapor in the gap between the enclosure plates.

3. The thermal insulation device of any of examples 1-2 wherein the vapor generating material comprises cyclohexane, 1-Butanol, Cyclohexane, Ethanol, Ethyl acetate, or water vapor.

4. The thermal insulation device of any of examples 1-3 wherein the first and second plates comprise a substantially planar portion and sides, wherein the sealing layer is disposed between sides of the first and second plates.

5. The thermal insulation device of example 4 wherein the sealing layer comprises a polymer material and a metal layer disposed between the polymer layer and ambient.

6. The thermal insulation device of example 5 and further comprising an additional layer of polymer and metal.

7. The thermal insulation device of any of examples 1-6 wherein the porous material is a nano-porous material comprising an open cell material.

8. The thermal insulation device of any of examples 1-7 wherein the porous material is a nano-porous material comprising a low-density mixture of fumed silica, fiberglass, and silicon carbide.

9. The thermal insulation device of example 1 wherein the porous material comprises a getter material.

10. A thermal insulation enclosure including a first plate, a second plate formed to nest adjacent the first plate with a gap between the first and second plates, a porous material disposed between the plates, a vapor generating material disposed in the gap, a sealing layer disposed between the first and second plates such that the porous material is sealed from ambient at a pressure less than ambient, a duplicate set of first and second plates having a porous material, vapor generating material and sealing layer formed to mate with the first and second plates to form a chamber, and a device disposed within the chamber that is thermally insulated from ambient by the enclosure.

11. The thermal insulation enclosure of example 10 wherein the first and second plates and duplicate first and second plates comprise a substantially planar portion and sides, wherein the sealing layer is disposed between sides of the first and second plates, wherein the sides of each set of plates align to form the chamber, and wherein the vapor generating material has a pressure vs. temperature relationship that modulates the thermal conductance of the vapor in the gap between the enclosure plates.

12. The thermal insulation enclosure of any of examples 10-11 wherein the vapor generating material comprises cyclohexane, 1-Butanol, Cyclohexane. Ethanol, Ethyl acetate, or water vapor.

13. The thermal insulation enclosure of any of examples 10-12 wherein the device within the enclosure comprises a fuel cell based power generator and wherein the enclosure includes a path from ambient to allow ambient oxygen to reach the device.

14. The thermal insulation device of any of examples 10-13 wherein the sealing layer comprises a polymer material and a metal layer disposed between the polymer layer and ambient.

15. The thermal insulation device of any of examples 10-14 wherein the porous material comprises an open cell material including a low-density mixture of fumed silica, fiberglass, and silicon carbide.

16. A method including pressing a porous material between two plates such that the plates are separated from each other by a gap defined by the porous material, including a vapor generating material in the gap; and in a partial vacuum, depositing a conformal sealing layer to cover the porous material in the gap between the two plates to form a gas seal of the porous material and vapor generating material from ambient and maintain the partial vacuum.

17. The method of example 16 wherein the porous material comprises a mixture of fumed silica, fiberglass, and silicon carbide, and wherein the vapor generating material comprises cyclohexane, 1-Butanol, Cyclohexane, Ethanol, Ethyl acetate, or water vapor.

18. The method of any of examples 16-17 wherein the sealing layer comprises a polymer material and a metal layer disposed between the polymer layer and ambient and wherein the vapor generating material has a pressure vs. temperature relationship that modulates the thermal conductance of the vapor in the gap between the enclosure plates.

19. The method of any of examples 16-18 and further comprising forming multiple sets of such plates and bringing two sets together to create an enclosure with a chamber, and further comprising placing a device within the chamber such that is thermally insulated from ambient.

20. The method of any of examples 16-19 wherein including the vapor generating material in the gap comprises including a capsule of vapor generating material in the gap and breaking open the capsule following depositing the conformal sealing layer. Although a few embodiments have been described in detail above, other modifications are possible. For example, the process flows may not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
   pressing a porous material between two plates such that the plates are separated from each other by a gap defined by the porous material;
   including a vapor generating material in the gap; and
   in a partial vacuum, depositing a conformal sealing layer to cover the porous material in the gap between the two plates to form a gas seal of the porous material and vapor generating material from ambient and maintain the partial vacuum.

2. The method of claim 1, wherein the porous material comprises a mixture of fumed silica, fiberglass, and silicon carbide.

3. The method of claim 1, wherein the vapor generating material comprises cyclohexane, 1-Butanol, Cyclohexane, Ethanol, Ethyl acetate, or water vapor.

4. The method of claim 1, wherein the sealing layer comprises a polymer material and a metal layer disposed between the polymer layer and ambient.

5. The method of claim 1, wherein the vapor generating material has a pressure vs. temperature relationship that modulates the thermal conductance of the vapor in the gap between the enclosure plates.

* * * * *